Figure 1:
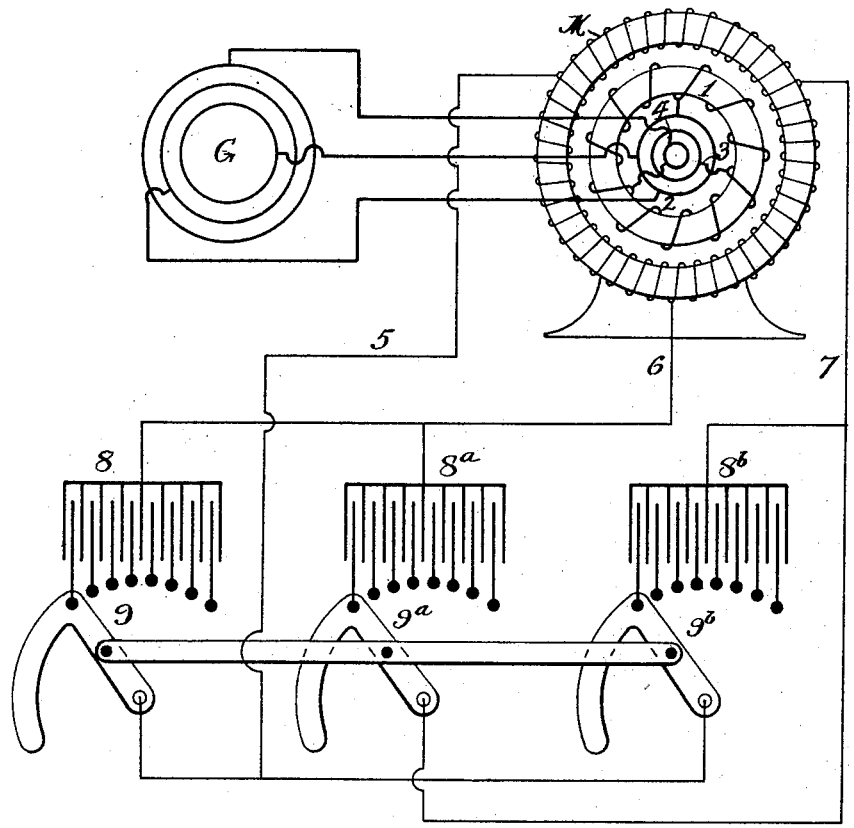

(No Model.) 3 Sheets—Sheet 1.

C. S. BRADLEY.
ROTARY FIELD MOTOR.

No. 557,957. Patented Apr. 7, 1896.

WITNESSES:
C. L. Belcher

INVENTOR
Charles S. Bradley
BY
his ATTORNEY.

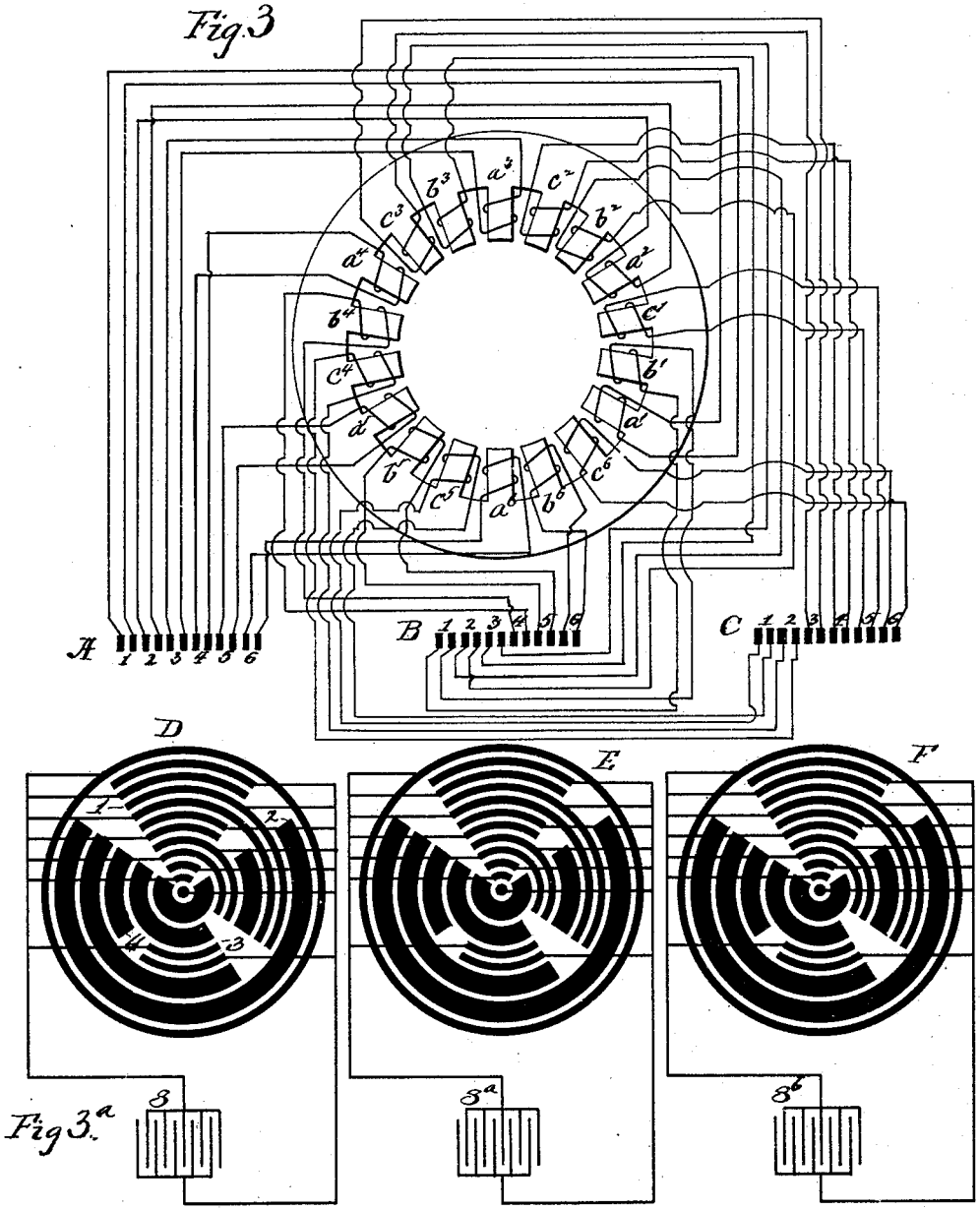

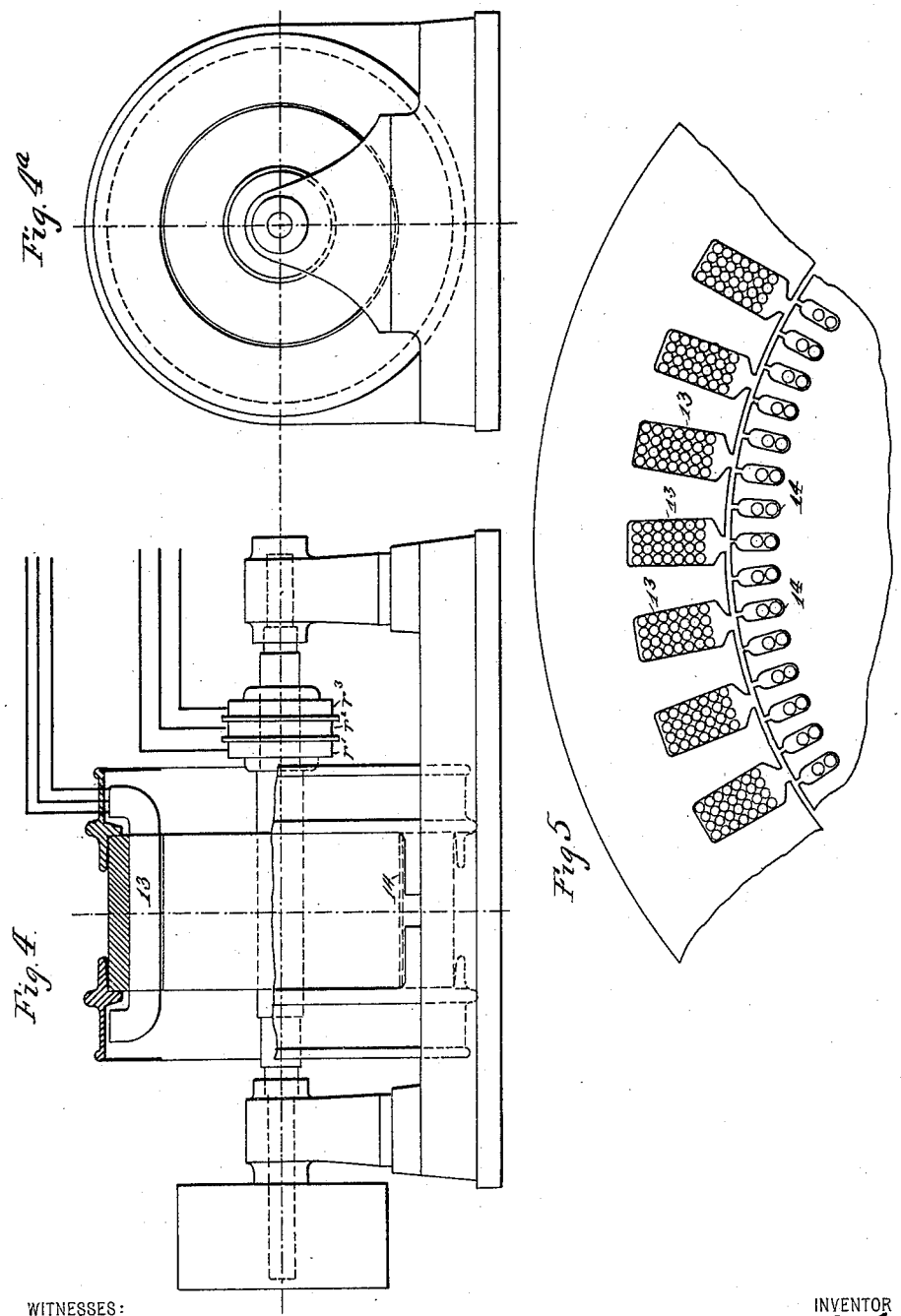

UNITED STATES PATENT OFFICE.

CHARLES S. BRADLEY, OF AVON, NEW YORK.

ROTARY FIELD-MOTOR.

SPECIFICATION forming part of Letters Patent No. 557,957, dated April 7, 1896.

Application filed September 30, 1895. Serial No. 564,058. (No model.)

*To all whom it may concern:*

Be it known that I, CHARLES S. BRADLEY, a citizen of the United States, and a resident of Avon, in the county of Livingston and State of New York, have invented certain new and useful Consonous Field Alternating Motors, of which the following is a specification.

This invention relates to a new type of alternating-current motor.

The object sought to be attained is to render the motor variable in speed and of strong running torque. The invention is especially applicable to polyphase motors in which a rotary or progressive field is developed, although it is also capable of application to the single-phase type of such motors.

In carrying out my invention I provide primary and secondary windings for the two members of the motor, the former being for connection with the source of current supply and the latter containing means for adjusting its capacity or inductance, or both, to render it approximately resonant—that is to say, in a state in which its inherent or natural rate of vibration will be approximately the same as the rate of the pulses of electromotive force imposed on it at any particular speed.

It will be understood by those familiar with the physics of alternating currents that the resonant rate or natural period of vibration of every electric circuit may be varied by changing its capacity or inductance, the product of these two factors measured in microfarads and henries, respectively, determining its rate in accordance with the formula $$K\,I = \frac{25{,}300}{R^2},$$

in which R represents the resonant rate, K the capacity, and I the inductance of the circuit. A circuit adjusted or "tuned" to this condition is acutely sensitive to impulses of electromotive force beating in harmony with its rate, and permit strong magnetizing-currents to flow under small initial electromotive forces. It has been found, however, that when a circuit is inductively related to the impulses of electromotive force a true resonant relation cannot be attained with good torque, but by proper adjustment of the secondary as to capacity and inductance a minimum impedence to current flow in both circuits may be attained readily. This adjustment has been termed "electrical consonance," and I therefore call my motor, in which the secondary circuits are adjusted for such a relation, a "consonous field-motor." The torque of the motor is greatly increased by such an adjustment.

It will be evident from the formula just recited that the natural rate of the secondary circuit varies in an inverse sense with the product of capacity and inductance. Consequently if the rate of impulses of electromotive force set up in the secondary vary it is necessary to make an adjustment to maintain the consonous relation, and, further, with an increase of rate the capacity or inductance, or both, must be decreased.

The impulses of electromotive force in the secondary are determined not by the rate of applied electromotive force in the primary circuit, but by the rate of cutting of the primary poles by the secondary winding, and therefore by the difference in speed of the shifting primary poles and the secondary element.

If both primary and secondary members of the motor are provided with multiphase windings, the best adjustment of the secondary circuits for a given speed will be that which is consonous with the difference in speed of the rotary primary field and the revolving element, since of course this difference determines the rate of electromotive-force impulses in the secondary circuit. Conversely a maximum torque at any desired speed may be attained, within the range of the motor, by adjusting the capacity-inductance relation of the secondary circuit or circuits to suit the rate of alternation set up in the secondary winding at such a speed. In starting, the impressed rate of alternation in the secondary will be a maximum, and when the motor rises in speed this rate will decline and would be zero at synchronism. If capacity be the variable factor for adjustment, it should be least in starting and greatest at maximum speed.

Let us assume, for example, that we have a triphase motor in which the primary is the revolving member, which is desirable for the reason that, the rate of alternation of the primary being higher than the secondary, the primary member should contain less iron to reduce hysteretic losses and heating. Current from a triphase circuit or transformer may be led in by three brushes bearing on the contact-rings connecting with three equidistant points of the primary winding. The secondary is preferably the outside stationary member of the motor, thus permitting connection to be made with the adjusting devices without rubbing-contacts. The secondary is connected at three equidistant points with three separate condensers or with a single triphase condenser of the kind described in my Patent No. 543,978, dated August 6, 1895. The armature being at rest when the circuit is first closed, the secondary rate of alternation will be a maximum, calling for a minimum amount of condenser-surface. The rotating member will accelerate until the consonous relationship begins to be destroyed between its rate of alternation and its natural period under the starting-capacity-inductance adjustment. If a higher speed is desired, more condenser may be cut in, and the motor will attain a higher speed under the consonous relation for that adjustment.

My invention therefore comprises in its essential features a method of controlling the speed and torque of a motor by varying its capacity and inductance, either or both, with the speed to maintain consonance or approximate resonance. It comprises also a motor having a consonous secondary. It comprises also a motor provided with means for varying the capacity-inductance product to maintain consonance at different speeds. It comprises also other features more or less generic, which will be hereinafter more fully described, and will be definitely indicated in the appended claims.

Figure 2:
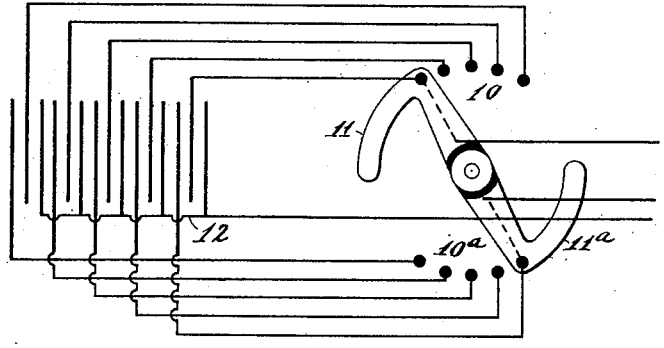

In the accompanying drawings, which illustrate the invention, Figure 1 is a diagrammatic view of a motor and supply-circuit embodying my invention, a separate condenser being shown in each branch or circuit of the secondary winding. Fig. 2 is a diagram showing a single triphase condenser and simple switch for varying the adjustment of the secondary circuits. Fig. 3 is a diagram of a consonous field winding employed in my invention, the winding being sectional and connected with a series of brushes arranged for coöperation with the switch shown in Fig. 3$^a$, by which the inductance may by varied. Figs. 4 and 4$^a$ are side and end elevations, respectively, of a motor structure embodying my invention; and Fig. 5 is an enlarged sectional view showing the structure of the primary and secondary members.

Referring to Fig. 1, G represents a triphase generator, and M a triphase motor. It will of course be understood that a triphase system is shown merely by way of example, and that a system of any number of phases might be employed. The three leads from the generator or from a transformer connected therewith are led into the primary revolving element 1 of the motor by three brushes and ring-contacts, as shown at 2 3 4. A simple ring-winding is shown on both members for simplicity of illustration. The secondary is tapped at three equidistant points and connected by conductors 5 6 7 with three condensers 8 8$^a$ 8$^b$ and a three-point switch 9 9$^a$ 9$^b$. The condensers connect by sections with contact-points over which the respective switch-brushes sweep, and the three brushes are controlled by a common lever. With this organization the switches may be simultaneously adjusted to cut any desired portion of the several condensers into the three parts or branches of the secondary winding. The position of adjustment shown corresponds to the starting position of the motor. The several secondary circuits have then their maximum rate of alternation. To attain consonance, therefore, the capacity and inductance should be of the smallest value; but one condenser-section is shown interposed in each circuit. The secondary winding is given a large amount of copper in the design relatively to the primary to lower the ohmic component of the impedance in the circuit and therefore permit a freer consonous vibration.

When consonance has been attained in my motor, the secondary rotary field is maintained (in the form now being described) and its magnetizing-currents are supplied by the three consonous circuits which include the condensers, and as the secondary currents lag behind the primary a torque will be produced which will cause the revolving element to turn in a direction contrary to that of the secondary field.

It will be evident from what has been heretofore said that to render the secondary circuits consonous at all speeds between rest and synchronism the condenser or condensers must needs be varied in adjustment from zero to infinity. For practical uses the range need be comparatively small, depending upon the highest and lowest speeds required in service. Let us suppose that we are operating a six-pole motor on a triphase circuit of sixty cycles per second. The primary rotary field will then have a speed of twenty revolutions per second. Let us suppose that the motor has been started up and its armature to have attained a speed of three revolutions per second. It revolves, as already stated, in a direction opposite the secondary field. The rate of alternation of the latter will therefore be $60-3\times3$, or fifty-one per second, and its poles will revolve around its core $51\div3$, or seventeen times per second. To secure a maximum torque at this lower rate, an increase of condenser will be required to produce a consonous adjustment, and the torque may be maintained high while the speed is progressively raised to any point short of synchronism by gradually increasing the capacity of the secondary. I prefer that the maximum speed shall be about seventy-five per cent. of that of the primary field, since such speeds may be attained with condensers or inductances of practicable size. The adoption of this maximum is, however, a matter of choice, determined by the relative cost of the condenser and motor. For example, in the case of the six-pole motor just considered the primary field will have a rate of twenty per second, or a speed of twelve hundred per minute. If the running speed of the motor be seventy-five per cent. of this, it will be nine hundred. Its rate of alternation will therefore be one-fourth of the primary rate, or fifteen per second. As the capacity for consonance approximately varies inversely as the square of the rate the condenser must be adjusted to $60 \times 60 \div 15 \times 15$, or about sixteen times as great as at starting.

In Fig. 2 of the drawings I have shown a modified mode of condenser adjustment. In this case a single condenser serves for all of the consonous secondary circuits. The condenser-plates corresponding to the three circuits are interleaved, as described in my patent hereinbefore referred to. Two sets of plates connect with contact-studs 10 $10^a$, over which sweeps a double switch $11^a$, connecting with two points of the secondary winding. The third point of the winding may connect with the third set of plates in parallel, as shown at 12.

In Figs. 3 and $3^a$ I have shown an organization in which the secondary winding is sectional and is controlled by a switch by which the sections may be connected in various relations—series, series multiple, or parallel. This organization permits the inductance to be widely varied as well as the torque of the motor. The condenser may in this case be constant in value, the change of adjustment for consonance being produced by a change in the coil connections of the secondary. As shown in the diagram, the core of the secondary element is provided with interiorly-projecting teeth—a construction which is observed in practice. A six-pole construction is shown and the coils of differing phase are wound on independent consecutive teeth. In practice the coils overlap and include a group of teeth. There are shown six coils in each phase—$a'$ to $a^6$, $b'$ to $b^6$, and $c'$ to $c^6$—each coil terminating in a corresponding pair of brushes A, B, or C. The brushes are spaced to engage a group of annular or segmental contacts on disks D E F. Each disk is provided with a plurality of contact-groups, according to the number of adjustments desired. As shown, there are four—1 2 3 4. The group 1 is composed of twelve insulated concentric segments connected in consecutive order with opposite sides of the condenser, as 8, and when brought under the brushes A, B, or C connects the coils of the secondary element in simple parallel with the condenser. The three disks D E F should be rigidly connected together, so as to simultaneously operate to maintain similar relations of capacity and inductance in the three secondary circuits. In group 2 the first and fourth, fifth and eighth, and ninth and twelfth connect with opposite sides of the condensers, the intermediate segments being disconnected from the condenser and arranged to bridge a connection between the brushes 2 and 3, 6 and 7, and 10 and 11. This group places the coils in three parallel branches of two in series. In group 3 segments 1 and 6 and 7 and 12 connect with opposite sides of the condenser, the other segments being disconnected from the condenser and arranged to bridge the intermediate brushes. This group places the coils in two branches of three coils each. Group 4 couples all of the coils in series, only the first and last segments being connected with opposite sides of the condenser, all other segments being arranged to interconnect the brushes.

In Figs. 4, $4^a$, and 5 are shown a practical motor construction. As seen at 13, the secondary core is provided with capacious slots to accommodate a large amount of copper, whereas the primary slots 14 may be much smaller. Current from a polyphase circuit may enter on three brushes bearing on contact-rings $r'$ $r^2$ $r^3$, connecting with the primary winding of the revolving element. The secondary connects by three conductors with the consonance-adjusting apparatus hereinbefore described.

An important feature of this type of motor is that few poles need be employed with a high rate of alternation in the supply-circuit, since it is consonance between the differential speed of the primary poles and the revolving element and the adjusted period of the secondary circuit which controls the torque, and consonance may exist at a very low speed of the revolving member, notwithstanding the primary field has few poles, and consequently a high speed of rotation.

Having thus described my invention, what I claim as new, and desire to secure by Letters Patent, is—

1. The method of regulating an alternating-current motor consisting in increasing the capacity-inductance product of its secondary circuit or circuits as the speed increases, and vice versa.

2. The method of regulating an alternating-current motor consisting in adjusting the capacity-inductance product of its secondary circuit or circuits in inverse proportion to the square of the rate of alternation of said secondary.

3. The method of controlling the speed of an alternating-current motor having primary and secondary windings on its respective members, consisting in adjusting the capacity-inductance product of its secondary circuit or circuits for electrical consonance at a desired speed.

4. The method of increasing the torque of an alternating-current motor at a given speed consisting in adjusting the secondary circuit or circuits of said motor for electrical consonance at said speed.

5. An alternating-current motor having primary and secondary windings on its respective members, the secondary circuit having a capacity-inductance product of a value to render it electrically consonous at a working-motor speed.

6. An alternating-current motor having primary and secondary windings on its respective members, the secondary circuit or circuits including means for varying its capacity-inductance product for electrical consonance throughout its range of working speeds.

7. An alternating-current electric motor having rotary field primary and secondary windings respectively on its two members, and means for adjusting the capacity-inductance product for electrical consonance at a given speed.

8. An alternating-current electric motor having inductively-related polyphase windings on its two members, the secondary winding or circuit being adjusted for electrical consonance in the several polyphase branches.

9. An alternating-current electric motor having inductively-related polyphase windings on its two members, and means for simultaneously varying the capacity-inductance product of the several branches for electrical consonance.

10. An alternating-current electric motor having primary and secondary windings respectively on its two members, and means for varying the capacity-inductance product of one winding for electrical consonance.

11. An alternating-current motor having its secondary circuit including a regulating switch for adjusting the inductance for electrical consonance at different motor speeds.

12. An alternating-current motor having a sectional secondary winding including a condenser and a switch for coupling its sections in different relations to vary the inductance.

13. An alternating-current motor having a sectional secondary winding including a condenser and a switch for coupling its sections in series or multiple to vary its inductance and the torque of the motor.

In testimony whereof I have hereunto subscribed my name this 10th day of September, A. D. 1895.

CHARLES S. BRADLEY.

Witnesses:
J. P. CAMPBELL,
ROBT. H. READ.